United States Patent
McLeod

(10) Patent No.: US 7,493,431 B2
(45) Date of Patent: Feb. 17, 2009

(54) METHOD AND APPARATUS FOR EXTENDING THE RANGE OF THE UNIVERSAL SERIAL BUS PROTOCOL

(75) Inventor: John Alexander McLeod, Surrey (CA)

(73) Assignee: Icron Technologies Corporation, Burnaby (CA)

( * ) Notice: Subject to any disclaimer, the term of this patent is extended or adjusted under 35 U.S.C. 154(b) by 451 days.

(21) Appl. No.: 10/911,586

(22) Filed: Aug. 5, 2004

(65) Prior Publication Data

US 2005/0033877 A1 Feb. 10, 2005

Related U.S. Application Data

(60) Provisional application No. 60/492,756, filed on Aug. 6, 2003.

(51) Int. Cl.
G06F 13/12 (2006.01)
G06F 13/38 (2006.01)
G06F 11/00 (2006.01)

(52) U.S. Cl. .......................................... 710/63; 714/55
(58) Field of Classification Search .................. 710/63
See application file for complete search history.

(56) References Cited

U.S. PATENT DOCUMENTS

| | | | |
|---|---|---|---|
| 5,588,140 A | 12/1996 | Misukanis et al. | |
| 5,781,747 A | 7/1998 | Smith et al. | |
| 5,784,581 A | 7/1998 | Hannah | |
| 5,797,028 A | 8/1998 | Gulick et al. | |
| 5,799,041 A | 8/1998 | Szkopek et al. | |
| 5,878,221 A | 3/1999 | Szkopek et al. | |
| 5,890,015 A | 3/1999 | Garney et al. | |
| 5,983,073 A | 11/1999 | Ditzik | |
| 6,282,593 B1 * | 8/2001 | Goodfellow | 710/300 |
| 6,308,215 B1 | 10/2001 | Kolbet et al. | |
| 6,311,294 B1 * | 10/2001 | Larky et al. | 714/44 |
| 6,381,666 B1 * | 4/2002 | Kejser et al. | 710/300 |
| 6,389,029 B1 | 5/2002 | McAlear | |
| 6,571,305 B1 * | 5/2003 | Engler | 710/100 |

(Continued)

FOREIGN PATENT DOCUMENTS

GB 2325997 12/1998

(Continued)

OTHER PUBLICATIONS

USB Specifications: http://www.faculty.iu-bremen.de/birk/lectures/PC101-2003/14usb/FINAL%20VERSION/usb_protocol.html.*

(Continued)

*Primary Examiner*—Henry W. H. Tsai
*Assistant Examiner*—Michael Sun
(74) *Attorney, Agent, or Firm*—Gerald A. Gowan; Gowan Intellectual Property

(57) ABSTRACT

A method and apparatus for extending the range of the Universal Serial Bus Protocol is provided wherein an expanded range host controller is used in combination with a remote extender located adjacent to a peripheral device. The expanded range host controller provides extended time values for responding to the USB protocols, while the remote extender provides for data transmissions with the peripheral device which comply with the USB protocols. An improved method for connecting USB devices to a computer over extended distances is provided.

17 Claims, 8 Drawing Sheets

U.S. PATENT DOCUMENTS

| | | | |
|---|---|---|---|
| 6,697,372 B1 | 2/2004 | McAlear | |
| 6,708,247 B1 * | 3/2004 | Barret et al. | 710/313 |
| 6,721,332 B1 | 4/2004 | McAlear | |
| 6,816,929 B2 * | 11/2004 | Ueda | 710/56 |
| 6,965,614 B1 | 11/2005 | Osterhout et al. | |
| 7,149,833 B2 * | 12/2006 | McLeod | 710/300 |
| 2002/0144042 A1 * | 10/2002 | Garney | 710/300 |

FOREIGN PATENT DOCUMENTS

| | | |
|---|---|---|
| WO | WO 00 49507 A | 8/2000 |
| WO | WO 00 67103 A | 11/2000 |
| WO | WO 02 088975 | 11/2002 |

OTHER PUBLICATIONS

Patent Abstracts of Japan; vol. 2000, No. 09, Oct. 13, 2000; & JP 2000-183920 A (Matsushita Electric Ind Co Ltd), Jun. 30, 2000.
Universal Serial Bus Specification, Rev. 2.0, Apr. 27, 2000, Compaq Computer Corp. et al., Section 8.4.5. Selected pages.

* cited by examiner

| Transaction Type | Host Request (PID) | Acknowledgement Behaviour |
|---|---|---|
| Isochronous IN transfer: HS Host – FS Device | CSPLIT/IN | Nothing |
| Isochronous IN transfer: HS Host – FS Device Multiple Split Transactions | CSPLIT/IN | Nothing |
| Isochronous IN transfer: HS Host – HS Device | IN | Nothing |
| Isochronous IN transfer: HS Host – HS Device High Bandwidth | IN | Nothing |
| Interrupt IN transfer: HS Host – LS Device | CSPLIT/IN | Nothing |
| Interrupt IN transfer: HS Host – FS Device | CSPLIT/IN | Nothing |
| Interrupt IN transfer: HS Host – HS Device | IN | ACK |
| Interrupt IN transfer: HS Host – HS Device High Bandwidth | IN | ACK |
| Control IN transfer: HS Host – LS Device Data Phase | CSPLIT/IN | Nothing |
| Control IN transfer: HS Host – FS Device Data Phase | CSPLIT/IN | Nothing |
| Control IN transfer: HS Host – FS Device Multiple Split Transactions: Data Phase | CSPLIT/IN | Nothing |
| Control IN transfer: HS Host – HS Device Data Phase Only | IN | ACK |
| Control OUT transfer: HS Host – HS Device Status Phase Only | IN | ACK |
| Bulk IN transfer: HS Host – FS Device | CSPLIT/IN | Nothing |
| Bulk IN transfer: HS Host – FS Device Multiple Split Transactions | CSPLIT/IN | Nothing |
| Bulk IN transfer: HS Host – HS Device | IN | ACK |

*Figure 7*
*(Prior Art)*

| Transaction Type | Host Request (PID) | Acknowledgement Behaviour | |
|---|---|---|---|
| | | Host | REX |
| Isochronous IN transfer: HS Host – FS Device | CSPLIT/IN | Nothing | Nothing |
| Isochronous IN transfer: HS Host – FS Device Multiple Split Transactions | CSPLIT/IN | Nothing | Nothing |
| Isochronous IN transfer: HS Host – HS Device | IN | Nothing | Nothing |
| Isochronous IN transfer: HS Host – HS Device High Bandwidth | IN | Nothing | Nothing |
| Interrupt IN transfer: HS Host – LS Device | CSPLIT/IN | Nothing | Nothing |
| Interrupt IN transfer: HS Host – FS Device | CSPLIT/IN | Nothing | Nothing |
| Interrupt IN transfer: HS Host – HS Device | IN | Don't care | ACK |
| Interrupt IN transfer: HS Host – HS Device High Bandwidth | IN | Don't care | ACK |
| Control IN transfer: HS Host – LS Device Data Phase | CSPLIT/IN | Nothing | Nothing |
| Control IN transfer: HS Host – FS Device Data Phase | CSPLIT/IN | Nothing | Nothing |
| Control IN transfer: HS Host – FS Device Multiple Split Transactions: Data Phase | CSPLIT/IN | Nothing | Nothing |
| Control IN transfer: HS Host – HS Device Data Phase Only | IN | Don't care | ACK |
| Control OUT transfer: HS Host – HS Device Status Phase Only | IN | Don't care | ACK |
| Bulk IN transfer: HS Host – FS Device | CSPLIT/IN | Nothing | Nothing |
| Bulk IN transfer: HS Host – FS Device Multiple Split Transactions | CSPLIT/IN | Nothing | Nothing |
| Bulk IN transfer: HS Host – HS Device | IN | Don't care | ACK |

*Figure 8*

METHOD AND APPARATUS FOR EXTENDING THE RANGE OF THE UNIVERSAL SERIAL BUS PROTOCOL

CROSS REFERENCE TO RELATED APPLICATIONS

This application claims the benefit of priority under 35 U.S.C. § 119(e) to U.S. Provisional Application Ser. No. 60/492,756 filed on Aug. 6, 2003, the entirety of which is hereby incorporated by reference.

FIELD OF THE INVENTION

This invention relates to methods and apparatus for transmitting signals between devices using Universal Serial Bus (USB) ports, and, in particular, to a method for allowing communications between devices using such ports over an extended range.

DESCRIPTION OF THE PRIOR ART

Universal Serial Bus (USB) is a technology designed to permit a wide range of peripherals to be attached to personal computers by the average user. The technology supports all of the common peripheral devices such as keyboards, mice, speakers, modems, joysticks, cameras and many others, and its use in current computers is common.

USB was created by an alliance of seven of the largest companies in the computer and communication markets. Those companies were Intel, Compaq, Microsoft, NorTel, NEC, Digital and IBM. The specifications defining USB (e.g. Intel et al., Universal Serial Bus Specification, Revision 1.0, January 1996; and updated as Revision 1.1 in Sep. 23, 1998, and further updated as Revision 2.0 in April 2000, and subsequent updates and modifications—hereinafter collectively referred to as the "USB Specification", which term can include future modifications and revisions) are non-proprietary and are managed by an open industry organization known as the USB Forum. The USB Specification establishes a number of criteria which must be met in order to comply to USB standards. The USB Specification also defines a number of terms, which definitions are adopted for the purposes of this specification.

Of most relevance to the present invention, however, is the feature that all known USB Specifications currently limit the distance that a device can be separated from its host PC to a maximum of 5 meters. By using a series of USB Hubs—devices that are intended to support increased populations rather than increased distances—this distance limitation can be increased, in theory, to 30 meters. However, this multiple hub solution is both expensive and clumsy. For example, to support a single device at a range of 30 meters the consumer must purchase five hubs. In addition, at least two of these hubs must be provided with electrical power. Since the individual cables between hubs are limited to 5 meters each, it is likely that some of the hubs would have to be positioned in very inconvenient and insecure locations.

In U.S. Pat. No. 6,381,666, the contents of which are incorporated herein by reference, a method and apparatus for extending the distance between a host PC and a peripheral device, is provided which increased the useable distance to 100 meters or more. While this approach has been beneficial, it would still be desirable to provide alternative and/or improved methods and apparatus for achieving this same effect.

SUMMARY OF THE INVENTION

Accordingly, while the range extending USB technology, as described in U.S. Pat. No. 6,381,666 has proven to be useful, it would still be desirable to provide improvements to the technology by providing an improved method and apparatus for enabling computer peripheral devices, utilizing the USB specification, to be used over an extended range.

Therefore, it is an objective of this invention to provide improved methods and apparatus to enable devices and hubs that conform to the USB specification to communicate over distances greater than that currently permitted under said USB specification.

It is a further object of the present invention that such extended range be achieved without the need for intermediate hubs, repeaters or other methods of electronic signal regeneration.

It is a further object of the present invention that no hardware or software changes need be made to the existing hubs and devices supported by the system and operating under the USB protocol. The invention, thereby, may be incorporated into networks composed of both conventional range and extended range devices.

It is a further object of the present invention that the apparatus be very cost effective, consistent with the broadest population of devices targeted by the USB industry.

It is a further object of the present invention that support be provided for high speed (HS), full speed (FS) and low speed (LS) USB devices.

It is a further object of the present invention that only minor modifications need be made to the design of conventional USB host controllers to provide such extended range.

It is a further object of the present invention that the interface between a conventional host controller and its parent processor be preserved.

These and other objects of the invention, which will become apparent herein, are attained by the present invention which invention provides a method and related apparatuses, wherein an extended range host controller (which is connected to, or part of a central processor) is connected to a remote extender device which, in turn, is connected to a conventional peripheral USB device, wherein signals between the central processor (or the extended range host controller) and the USB peripheral device are processed in the extended range host controller and/or the remote extender so as to allow the central processor and the USB device to be located at distances greater than normally allowed in the USB specification. In particular, the extended range host controller and the remote extender are separated by distances of greater than 5 meters.

Accordingly, in a first aspect, the present invention provides a method for transmitting a data stream, over an extended distance of greater than 5 metres, from an extended range host controller to a peripheral device, wherein said peripheral device conforms to the requirements of the USB Specification, through an remote extender located within 5 meters of said peripheral device, which method comprises:

(A) for outgoing data streams: i) providing said extended range host controller with a maximum time value within which maximum time value said extended range host controller must complete transmission of a data packet to said peripheral device, through said remote extender, and begin receiving a response packet from said peripheral device, through said remote extender; and ii) adjusting said maximum time value in said extended range host controller to provide a maximum time value which permits USB transmissions over said extended distance; and (B) for incoming data streams: a) forwarding a request for incoming data from said extended range host controller to said peripheral device by sending said request to said remote extender, and then having said remote extender forward said request to said peripheral device; b) having said peripheral device prepare and send said incoming data to said remote extender; c) having said remote extender optionally forward an acknowledgement of receipt to said peripheral device; d) having said remote extender forward said incoming data to said extended range host controller; and e) providing said extended range host controller with a maximum time value within which maximum time value said peripheral device must respond to said request and adjusting said maximum time value in said extended range host controller to provide a maximum time value which permits USB transmissions over said extended distance.

In a further aspect the present invention also provides an apparatus for transmitting data between a central processor and a peripheral device over an extended distance; said apparatus comprising:

a) a central processor unit for initiating a data-transfer session;
b) a host controller for performing a data-transfer session on command from said central processor unit, and for generating an original data-transfer command packet;
c) optionally, means for converting said original data-transfer command packet into a converted command packet having a format suitable for transmission over extended distances;
d) a signal distribution system;
e) means for transmitting said data-transfer command packet or said converted command packet, as a coded command packet, over said signal distribution system;
f) a remote extender unit for receiving said coded command packet, and optionally converting said coded command packet to said original data-transfer command packet;
g) means in said remote extender unit for delivering said original data-transfer command packet to a peripheral device;
h) means in said remote extender unit for receiving a data-transfer response packet from said peripheral device, and for optionally converting said data-transfer response packet to a converted response packet having a format suitable for transmission over extended distances;
i) means in said remote extender unit for transmitting said data-transfer response packet or said converted response packet, as a coded response packet, over said signal distribution system to said host controller;
j) optionally, means in said remote extender unit for sending a local data-transfer handshake packet to said peripheral device;
k) means for receiving, at said host controller, said coded response packet; and optionally converting said coded response packet to said data-transfer response packet;
l) means in said host controller for optionally generating a remote data-transfer handshake packet, and optionally converting said remote data-transfer handshake packet into a converted handshake packet having a format suitable for transmission over extended distances;
m) means in said host controller for transmitting said data-transfer handshake packet or said converted handshake packet, as a coded handshake packet, over said signal distribution system;
n) means in said remote extender unit for receiving said coded handshake packet, and optionally converting said coded handshake packet to said remote data-transfer handshake packet; and wherein said host controller comprises: (i) means for establishing a maximum time value between the time where said host controller completes sending said data transfer command packet and begins receiving said coded response packet; ii) means for establishing a maximum time value which permits extended range USB transmissions; and (iii) means for establishing a first end of frame marker (EOF1) for completion of transmission of said data transfer command packet, which first end of frame marker allows for completion of the receipt of said coded response packet within a selected second end of frame (EOF2) time, and optionally, said remote expander has means for providing an acknowledgement packet to said peripheral device, when required.

DESCRIPTION OF THE PREFERRED EMBODIMENTS

In a preferred embodiment, all digital signals conform to the USB Specification (other than for the distance between devices). Also, the remote extender unit and/or the extended range host controller may store signals, if necessary. This storage period, and any other storage period referred to in the present specification, may be a very short time period. For example, the case where the reply signal is received in time to respond to the original digital signal, the reply signal may be also immediately forwarded with minimal storage time.

The extended range host controller can be essentially the same as a "standard" host controller of the prior art, other than being adapted to act as an extended range device, in accordance with the present invention.

The extended distance is greater than the USB standard of 5 meters. In a preferred embodiment, however, the extended distance exceeds 30 meters, and more preferably, equals or exceeds 100 meters.

As with the prior art, the method of the present invention can be used in a systems wherein said host controller is a PC, and said peripheral device is, for example, a camera, a mouse, a keyboard, a monitor or a speaker or speakers, or any other device capable of being operatively connected to a host controller or PC.

While a number of different signal distribution systems might be used, preferably, the signal distribution system utilizes unshielded twisted pair (UTP) wiring (or cabling). However, other signal distribution systems such as, for example, coaxial cable, shielded twisted pair, wireless transmission, or fibre optic systems using fibre optic cabling, can also be utilized. If necessary, or if desired, the signals being sent between the extended range host controller and the remote extender can modified for transmission over the signal distribution system. Once received by either device, the modified signals are then converted back to their original format, or to an equivalent format.

BRIEF DESCRIPTION OF THE DRAWINGS

The invention, and various aspects thereof will be described by reference to the attached drawings wherein:

FIG. 7 is a table showing acknowledgement behaviour according to the prior art USB protocol;

FIG. 8 is a table showing acknowledgement behaviour according to the invention;

DETAILED DESCRIPTION OF THE INVENTION

Figure 1:
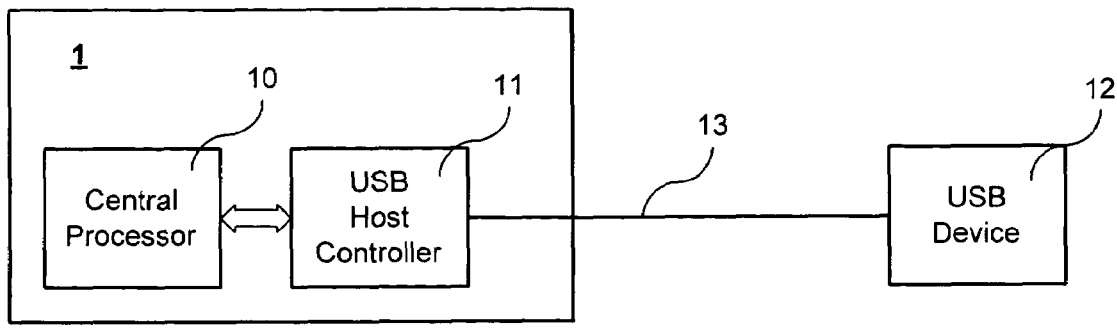
FIG. 1 is a block diagram of a system according to USB.

FIG. 1 is a block diagram of a prior art system designed according to the USB Specification. According to the USB specifications, a USB-enabled computer (1) may be assembled by equipping a central processor unit (10) with an input/output unit known as a USB host controller (11). The USB host controller (11) performs input/output operations according to the USB protocol and communicates with an external peripheral USB device (12) over a USB cable (13). The USB cable is not permitted to exceed 5 metres in length.

Figure 2:
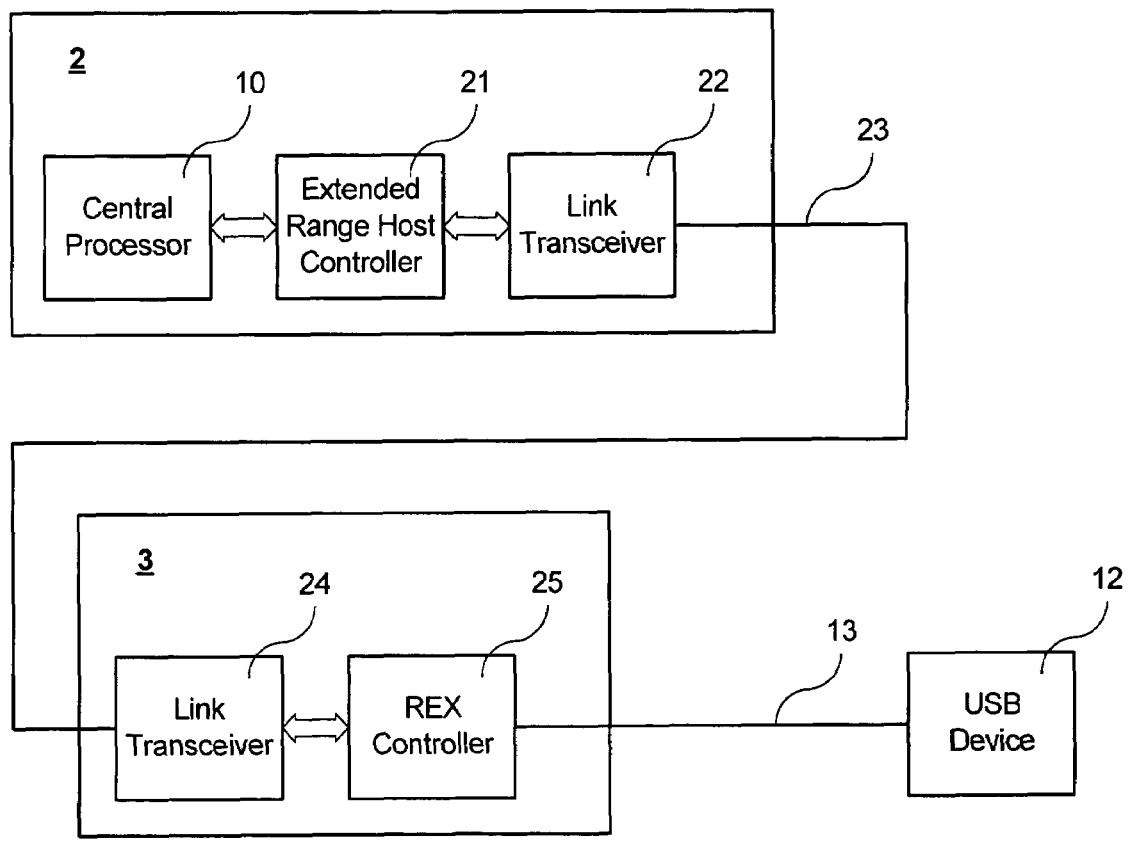
FIG. 2 is a block diagram of a system for communicating with USB devices over an extended range, according to the invention.

FIG. 2 is a block diagram of a system for communication between USB devices over an extended range, according to the present invention. In this arrangement, input/output operations for central processor (10) are performed by an extended range host controller (ERHC) (21). The ERHC (21) preferably generates a "modified" form of the USB protocol that is delivered to a local link transceiver (22). Link transceiver (22) generates physical signals for transmission over external media (23) to a remote link transceiver (24) which can be located at an extended distance from the local link transceiver (22).

As such, in this embodiment of the present invention, a central processor (10), an extended range host controller (21) and a link transceiver (22) are assembled as an extended range computer (2). It will be apparent to those skilled in the art that different combinations of these components might be used and that alternative packaging arrangements are possible.

The remote link transceiver (24) receives signals from the physical media and delivers the received signals to the REX controller (25). The REX controller (25) then, if necessary, preferably converts the received signals to electrical signals compatible with the USB protocol and delivers these electrical signals over USB cable (13) to USB peripheral device (12). The reverse process occurs when signals are passed from USB device (12) to ERHC (21).

As such, in this embodiment of the present invention, a link transceiver (24) and a REX controller (25) are assembled as a remote extender (3). It will be apparent to those skilled in the art that different combinations of these components might be used and that alternative packaging arrangements are possible.

For this embodiment of the present invention, the external media (23) is Category 5 unshielded twisted pair cable and the distance between transceivers (22) and (24) can be up to 100 metres. In other embodiments, however, the external media can be changed. For example, in another embodiment of the invention, the external media (23) can be a fiber-optic cable and the distance between transceivers (22) and (24) can be up to 2 kilometres. A wide variety of other medias might also be used and transceivers (22) and (24) would be selected or modified to transmit and/or receive suitable signals based on the selection of the external media (23).

As such, it will be apparent to those skilled in the art that different external medias might be used, and that other choices for transmission systems and external media between link transceivers (22) and (24) are possible.

Figure 3:
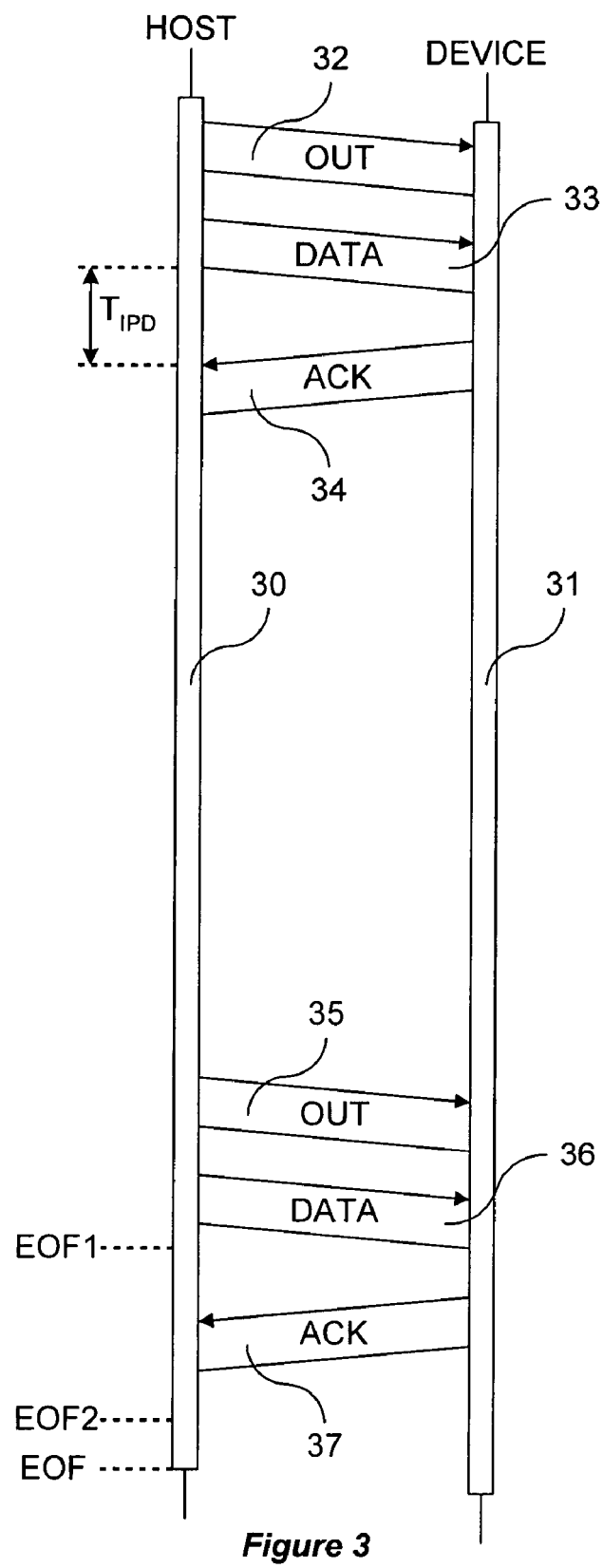
FIG. 3 is a sequence diagram showing an asynchronous output transfer according to the prior art USB protocol using an arrangement as shown in FIG. 1.

FIG. 3 is a sequence diagram showing an asynchronous output transfer according to the USB protocol. The format used in the diagram is attributable to Jacobson et al. (Ivar Jacobson, Magnus Christerson, Patrick Jonsson and Gunnar Overgaard, Object-Oriented software Engineering: A Use Case Driven Approach, Addison-Wesley, 1992.)

The USB protocol supports four transfer types, known as Isochronous, Bulk, Interrupt and Control. For the purposes of this application, the Bulk, Interrupt and Control transfer types will be referred to collectively as Asynchronous transfers. Asynchronous transfers exhibit a common behaviour whereby a successful exchange between a sender and a receiver is completed with an Acknowledgement packet. Isochronous packets, in comparison, are not acknowledged and transmission is considered to be on a "best efforts" basis.

The control logic (30) within the host controller generates a notification of output data (32) and transmits said notification to the attached USB device where it is received by device logic (31). The host control logic (30) then assembles the notified data packet (33) and transmits same to the USB device where it is received by device control logic (31). Upon successful reception of said data packet (33), device control logic (31) sends an acknowledgement packet (34) that is received by host control logic (30).

The host control logic (30) monitors the progress of the packet interchange by starting a timer ($T_{IPD}$) when it completes sending data packet (33) and cancelling said timer when said host control logic starts to receive acknowledgement packet (34). Under the USB specification, the maximum allowable value of said standard USB timer ($T_{IPD}$) is currently set at 10.4 μs for low-speed packets, 1.3 μs for full-speed packets, and 1.5 μs for high-speed packets. The speed of light limits the distance over which signals can be transmitted within these time constraints.

An additional aspect of the USB protocol is that time on the USB is divided into frames and micro-frames. For the purposes of this application, both frames and micro-frames are handled similarly and the operation of the system will be described using "frames" only, although the term "frame" will hereinafter be taken to refer to either "frames" or "micro-frames" as appropriate. FIG. 3 shows a second data interchange occurring close to the end of frame (EOF) marker. The data exchange is composed of notification packet (35), data packet (36) and acknowledgement packet (37) as described previously. It is an aspect of USB that host control logic (30) must complete sending the last outbound packet (36) of a frame before time marker (EOF1). It is a further aspect of USB that host control logic (30) must complete receiving the last inbound packet of a frame before time marker (EOF2).

Figure 4:
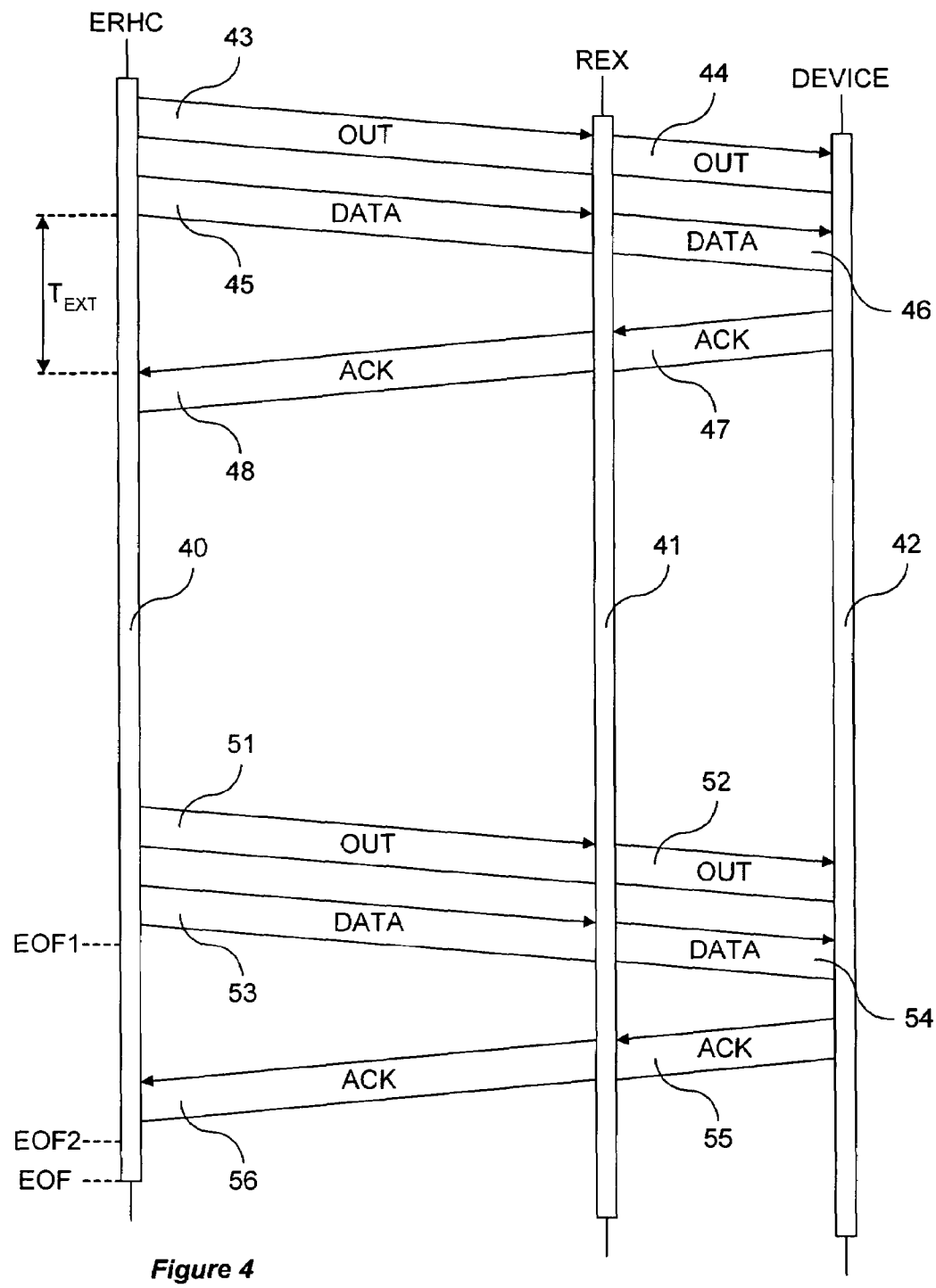
FIG. 4 is a sequence diagram showing an asynchronous output transfer according to the invention.

FIG. 4 is a sequence diagram showing an asynchronous output transfer according to the present invention. The control logic (40) within the extended range host controller (ERHC) generates a notification of output data (43) and transmits the notification to the remote extender (REX). The control logic (41) within the remote extender receives the notification and forwards the received notification (44) to the USB device. The control logic (42) within the USB device receives the forwarded notification.

The control logic (40) within the ERHC unit assembles the notified data packet (45) and transmits the data packet to the REX unit. The control logic (41) within the REX receives the data packet and forwards the received data packet (46) to the USB device. The control logic (42) within the USB device receives the forwarded data packet. Upon successful reception of the forwarded data packet, device control logic (42) generates an acknowledgement packet (47) and transmits same to the REX. Control logic (41) receives the acknowledgement packet (47) and forwards same to the ERHC unit. ERHC control logic (40) receives the forwarded acknowledgement packet (48). According to the invention, the value of timer ($T_{EXT}$) is increased beyond the standard value of timer ($T_{IPD}$) to permit packet sequence (45-46-47-48) to be completed over the extended distances of interest in the practice of the present invention.

In one embodiment of the invention, timer ($T_{EXT}$) is set to permit communication over a distance of 100 metres. In another embodiment of the invention said timer ($T_{EXT}$) is set to permit communication over a distance of 2 kilometres. (It will be apparent to those skilled in the art that said timer values are not unique and other choices for communication distance are possible.) In a more preferred embodiment of the invention, however, said timer is dynamic and can be optimised for a range of communication distances.

The value of the timer ($T_{EXT}$) can be pre-set to a given value and thus permit only a fixed maximum distance, or can be adjustable in order to vary the value depending on the nature and distance of the communication connection. With this dynamic arrangement, it would be possible for the system to determine the actual delay of the installation, and adjust the value of timer ($T_{EXT}$) appropriately.

The advantage of this arrangement is that the efficiency of the system could be optimised by tuning the timers to the minimum timer value necessary for the installation rather than using an arbitrary general value. This would permit higher usable bandwidth, and might increase reliability. The delay measurement could be automatically determined at power-up so that the system could adjust to any changes in the system configuration. Accordingly, if the system were moved from a short run to a longer run, it would automatically compensate for the new situation.

Accordingly, the present invention provides a method for transmitting asynchronous data from an extended range host controller to a peripheral device, as described hereinabove, said method comprising:

a. transmitting, from said extended range host controller, a notification of asynchronous data to a remote extender over a signal distribution system;

b. receiving, at said remote extender, said notification of asynchronous data;

c. forwarding, from said remote extender, said received notification of asynchronous data to a peripheral device;

d. transmitting, from said extended range host controller, an asynchronous data packet to said remote extender over a signal distribution system;

e. starting, at said extended range host controller, a round-trip timer after the last data bit of said asynchronous data packet has been transmitted;

f. receiving, at said remote extender, said asynchronous data packet;

g. forwarding, from said remote extender, said received asynchronous data packet to said peripheral device;

h. receiving, at said remote extender, an acknowledgement token from said peripheral device;

i. forwarding, from said remote extender, said received acknowledgement token to said extended range host controller;

j. receiving, at said extended range host controller, said forwarded acknowledgement token; and k. stopping, at said extended range host controller, said round-trip timer when the first data bit of said forwarded acknowledgement token is received, wherein, the round-trip timer maximum value in said extended range host controller has been extended so that, when stopped, said round-trip timer value is less than said round-trip timer maximum value.

FIG. 4 also shows a second data interchange occurring close to the end of frame (EOF) marker. The data exchange is composed of notification packet (51, 52), data packet (53, 54) and acknowledgement packet (55, 56) as described previously. It is an aspect of USB that host control logic (40) must complete sending the last outbound packet (53) of a frame before time marker (EOF1). It is a further aspect of USB that host control logic (40) must complete receiving the last inbound packet (56) of a frame before time marker (EOF2).

According to the invention, time marker (EOF1) is advanced with respect to time marker (EOF) to permit packet sequence (53-54-55-56) to be completed over extended distances. In one embodiment of the invention said time marker (EOF1) is set to permit communication over a distance of 100 metres. In another embodiment of the invention said time marker (EOF1) is set to permit communication over a distance of 2 kilometres. (It will be apparent to those skilled in the art that said time marker values are not unique and other choices for communication distance are possible.) In a more preferred embodiment of the invention, the time marker is also dynamic and can be optimised for a range of communication distances, as was described with respect to timer ($T_{EXT}$).

Figure 5:
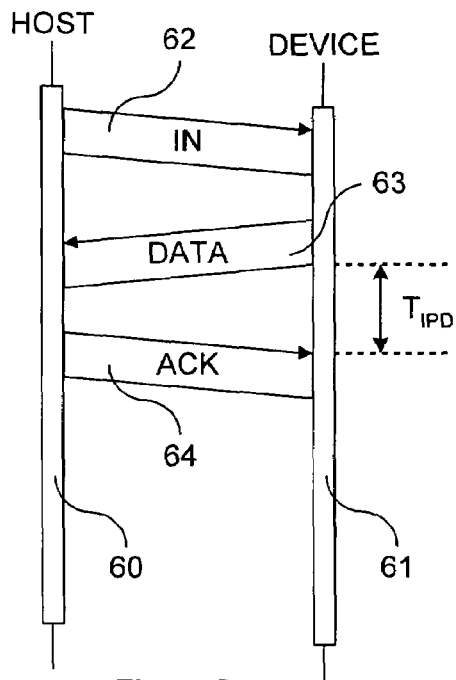
FIG. 5 is a sequence diagram showing an asynchronous input transfer according to the prior art USB protocol.

FIG. 5 is a sequence diagram showing an asynchronous input transfer according to the USB protocol. The control logic (60) with the host controller generates a request for input data (62) and transmits said request to the attached USB device where it is received by device logic (61). Said device logic (61) then assembles the requested data packet (63) and transmits same to the host controller where it is received by control logic (60). Upon successful reception of said requested data packet, host control logic (60) generates an acknowledgement packet (64) and transmits same to the USB device where it is received by device logic (61).

It is an aspect of the USB protocol that device control logic (61) shall monitor the response to an inbound asynchronous data packet by starting a timer ($T_{IPD}$) when it completes sending data packet (63) and cancelling said timer when it starts to receive acknowledgement packet (64). The value of said timer is the same as described in FIG. 3.

Figure 6:
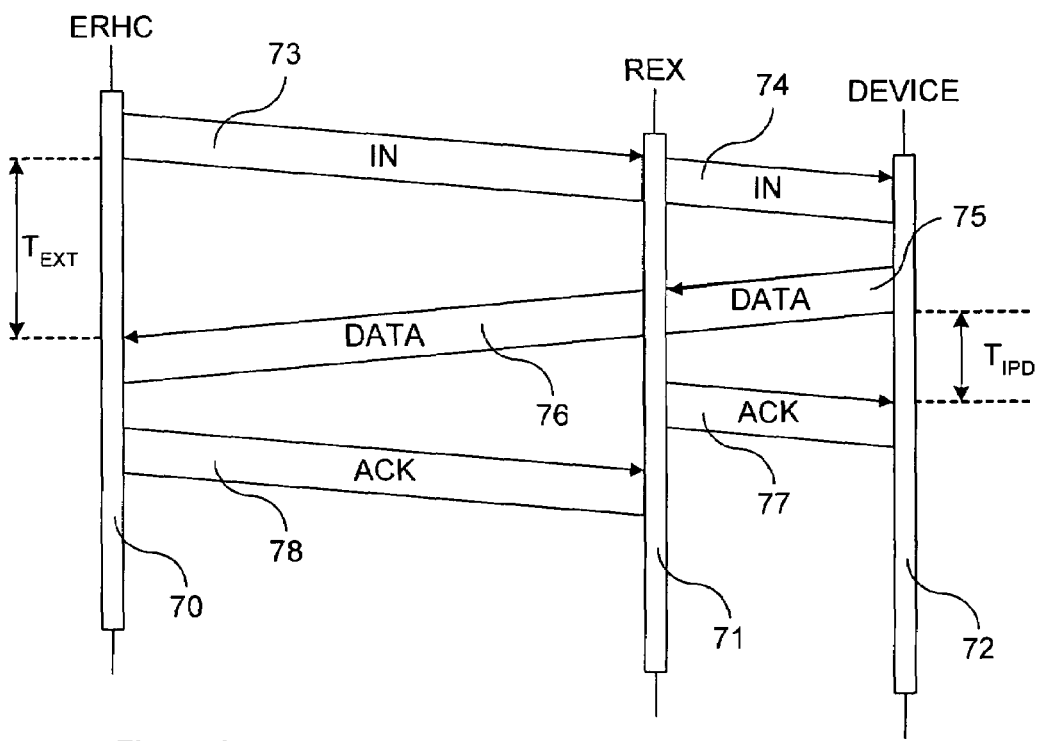
FIG. 6 is a sequence diagram showing an asynchronous input transfer according to the invention.

FIG. 6 is a sequence diagram showing an asynchronous input transfer according to the invention. The control logic (70) within the ERHC unit generates a request for input data (73) and transmits said request to the REX unit. The control logic (71) within the REX unit receives said request for input data and forwards said request to the USB device. The control logic (72) within the device receives said forwarded request for input data (74). Control logic (72) then generates an input data packet, transmits said packet to the REX unit and starts response timer ($T_{IPD}$). Control logic (71) within the REX unit receives said input data packet (75) and forwards same to the ERHC unit. Said control logic (71) also generates a local acknowledgement packet (77) and transmits same to the device. Device control logic (72) receives said local acknowledgement packet (77) and cancels timer ($T_{IPD}$).

Control logic (70) within the ERHC unit receives said forwarded input data packet (76). According to the invention, the value of the extended range host controller timer ($T_{EXT}$) is increased to permit packet sequence (73, 74, 75, 76) to be completed over the extended distances of interest in the practice of the present invention. Said control logic (70) further generates a remote acknowledgement packet (78), or "token" which it transmits to the REX unit. Control logic (71) absorbs said remote acknowledgement packet (78).

Accordingly, the present invention also provides a method for transmitting asynchronous data from a peripheral device to an extended range host controller as hereinabove described, said method comprising:

a. transmitting, from said extended range host controller, a request for asynchronous data to a remote extender over a signal distribution system;

b. starting, at a host controller, a round-trip timer when the last data bit of said request for asynchronous data has been transmitted;

c. receiving, at said remote extender, said request for asynchronous data;

d. forwarding, from said remote extender, said received request for asynchronous data to said peripheral device;

e. receiving, at a remote extender, an asynchronous data packet from said peripheral device;

f. forwarding, from said remote extender, said received asynchronous data packet to said extended range host controller;

g. transmitting, from said remote extender, an acknowledgement token to said peripheral device;

h. receiving, at said extended range host controller, said forwarded asynchronous data packet;

i. stopping, at said extended range host controller, said round-trip timer when the first data bit of said forwarded acknowledgement token is received, wherein, the round-trip timer maximum value in said extended range host controller has been extended so that, when stopped, said round-trip timer value is less than said round-trip timer maximum value;

j. optionally transmitting, from said extended range host controller, a further acknowledgement token to said remote extender; and k. optionally absorbing, at said remote extender, said further acknowledgement token.

FIG. 7 is a table showing acknowledgement behaviour of the host controller according to the prior art USB protocol. The first column lists the input transfer types provided by a high-speed (HS) host controller. In addition to the four transfer types described earlier, a distinction is made according to whether the device being communicated with is itself high speed (HS), full speed (FS) or low speed (LS). The second column provides the name of the unique packet identifier (PID) associated with each behaviour. According to the USB protocol, the PID field is four bits in length, allowing for 16 distinct behaviour types. The third column lists the acknowledgement behaviour required of the host controller in response to a successful input data transfer.

This table thereby defines the behaviour that is expected by a standard USB device engaged in various data transfer types. In particular, it describes whether or not a device expects to receive an acknowledgement packet (or "token") depending upon the type of transfer in progress. It will be noticed from the table that the acknowledgement behaviour cannot be determined from the PID alone; there are some IN transfers where an acknowledgement is sent to the device and other IN transfers where an acknowledgement is not sent to the device.

FIG. 8 is a table showing acknowledgement behaviour of the system according to the invention. The table follows the format and content of FIG. 7, with the exception that the acknowledgement behaviour is partitioned between the ERHC unit and the REX unit. The table shows that the REX unit will generate the local acknowledgement packets (or tokens) required for Asynchronous (interrupt, control and bulk) input (IN) sequences only. Isochronous input (IN) and complete-split/input (CSPLIT/IN) sequences do not require acknowledgements.

Figure 9:
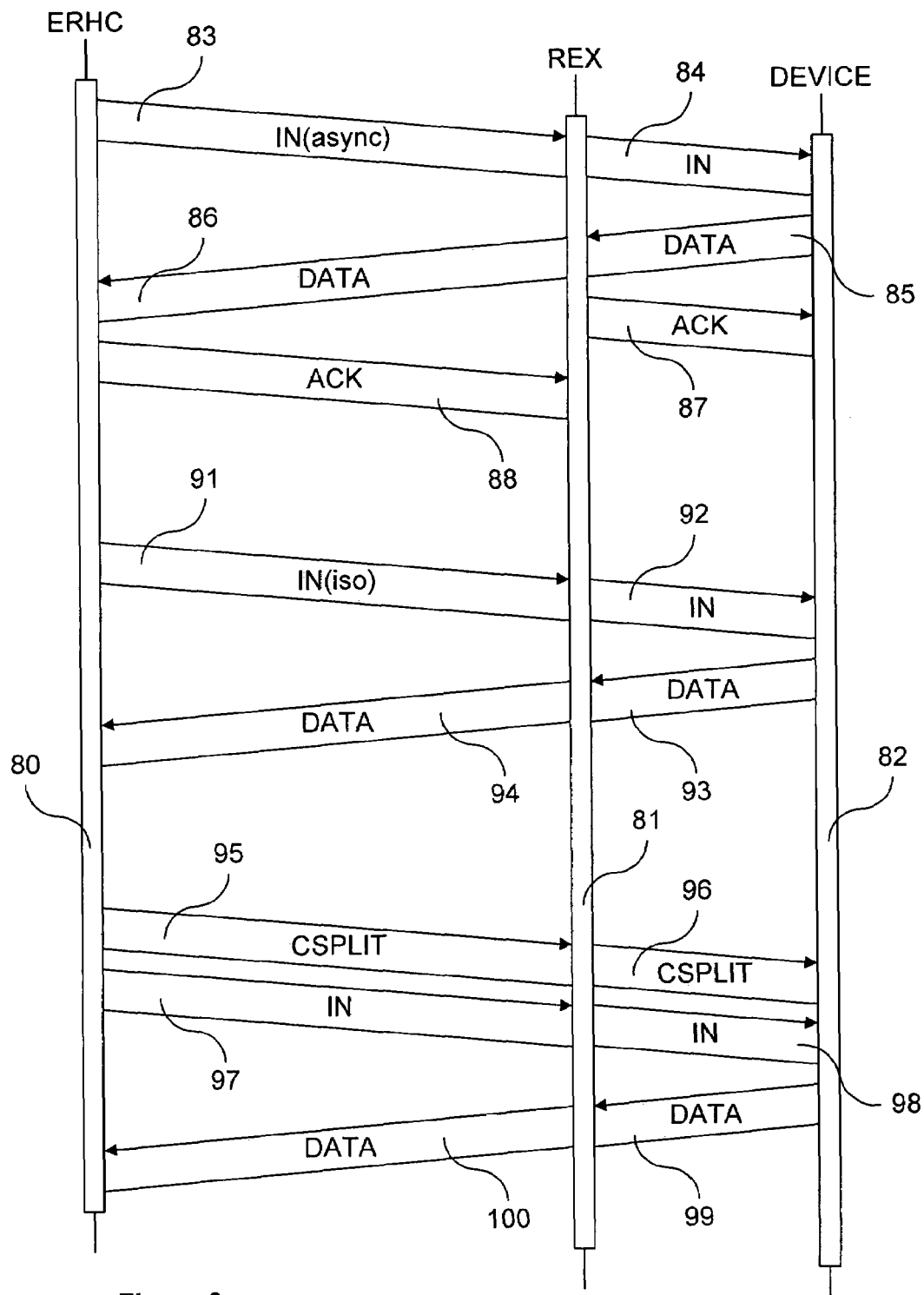
FIG. 9 is a sequence diagram showing acknowledgement behaviour according to the invention.

FIG. 9 is a sequence diagram showing acknowledgement behaviour according to the invention. The first sequence (83-88) shows the acknowledgement behaviour for asynchronous input transfers. The second sequence (91-94) shows the acknowledgement behaviour for isochronous input transfers. The third sequence (95-100) shows the acknowledgement behaviour for complete-split/input transfers.

In the first sequence, control logic (80) within the ERHC unit generates a request for asynchronous input data (83) and transmits said request to the REX unit. The control logic (81) within the REX unit receives said request for input data and forwards said request to the USB device. The control logic (82) within the device receives said forwarded request for input data (84). Control logic (82) then generates an input data packet and transmits said packet to the REX unit. Control logic (81) within the REX unit receives said input data packet (85) and forwards same to the ERHC unit. Said control logic (81) also generates a local acknowledgement packet (87) and transmits same to the device. Device control logic (82) receives said local acknowledgement packet (87).

Control logic (80) within the ERHC unit receives said forwarded input data packet (86) and generates a remote acknowledgement packet (88), which it transmits to the REX unit. Control logic (81) absorbs said remote acknowledgement packet (88).

In the second sequence, control logic (80) within the ERHC unit generates a request for isochronous input data (91) and transmits said request to the REX unit. The control logic (81) within the REX unit receives said request for input data and forwards said request to the USB device. The control logic (82) within the device receives said forwarded request for input data (92). Control logic (82) then generates an input data packet and transmits said packet to the REX unit. Control logic (81) within the REX unit receives said input data packet (93) and forwards same to the ERHC unit. Control logic (80) receives said input data packet (94).

In the third sequence, control logic (80) within the ERHC unit generates a request for complete-split input data (95) and transmits said request to the REX unit. The control logic (81) within the REX unit receives said request for input data and forwards said request to the USB device. The control logic (82) within the device receives said forwarded request for complete-split input data (96). Control logic (82) then generates an input data packet and transmits said packet to the REX unit. Control logic (81) within the REX unit receives said input data packet (99) and forwards same to the ERHC unit. Control logic (80) receives said input data packet (100).

Figure 10:
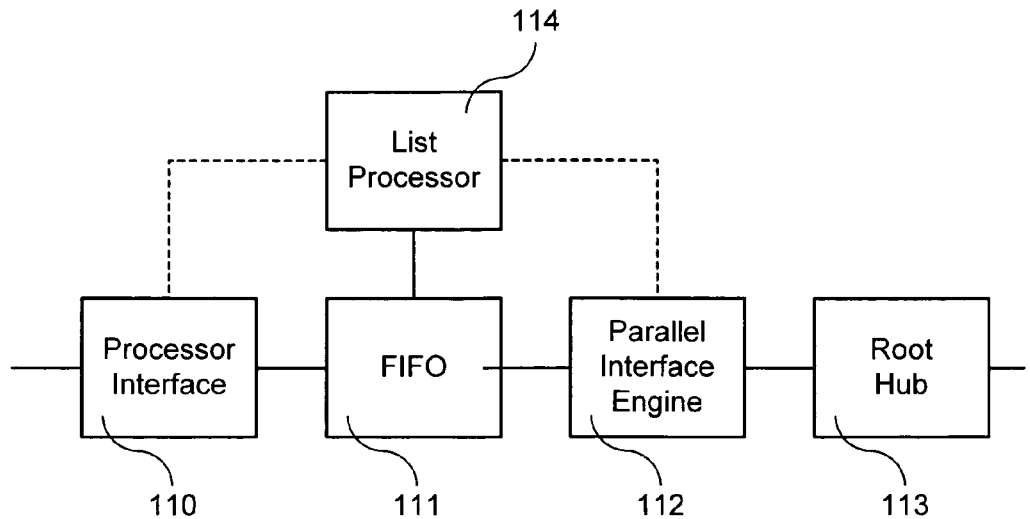
FIG. 10 is a block diagram showing one embodiment of an extended range host controller according to the invention.

FIG. 10 is a block diagram showing one embodiment of an extended range host controller (ERHC) according to the invention. The Processor Interface block (110) receives transaction requests from the local processor and passes the results back to said local processor. The electrical properties of said block (110) can be chosen to suit the local environment in which the ERHC is used. The Processor Interface block (110) stores successive requests in FIFO (111) under the control of the List Processor block (114). The other main function of said block (114) is to parse the transactions held in FIFO (111) into individual data sequences that can be handled by Parallel Interface Engine (112). In this example, said block (112) converts the data from parallel format (8-/16-bits wide)

to serial format (1-bit wide), before passing the serial data to the Root Hub (113). Said block (113) provides the interface to the physical transceivers that are used to drive the USB.

Figure 11:
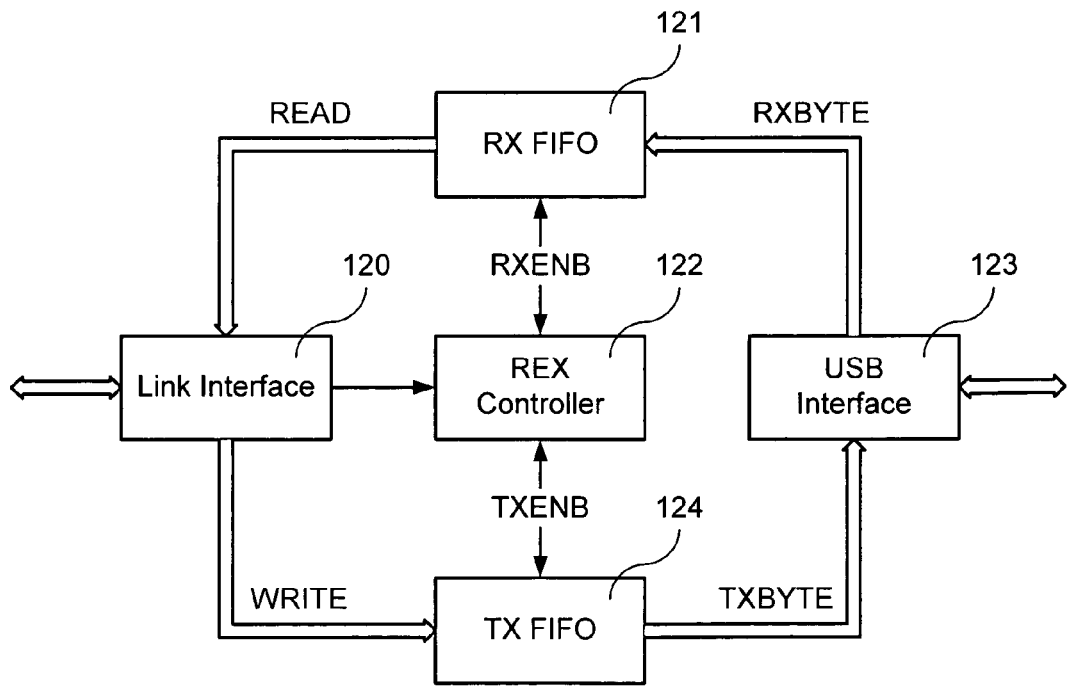
FIG. 11 is a block diagram showing one embodiment of a remote extender according to the invention.

FIG. 11 is a block diagram showing one embodiment of a remote extender (25) according to the embodiment of the invention shown in FIG. 2. In this embodiment, Link Interface (120) receives signals from the extended range link and stores said received signals in TX FIFO (124) under the control of REX Controller (122). When said block (122) determines that the stored information should be forwarded to the attached USB device, block (122) commands block (124) to forward the selected data to USB Interface (123). Said block (123) converts the forwarded data to electrical signals compatible with the USB.

In the reverse direction, USB Interface (123) receives signals from the USB and stores said received signals in RX FIFO (121) under the control of REX Controller (122). When said block (122) determines that the stored information should be forwarded to the extended range link, block (122) commands block (121) to forward the selected data to Link Interface (120). Said block (120) converts the forwarded data to electrical signals compatible with the extended range link.

Thus, it is apparent that there has been provided, in accordance with the present invention, USB devices which fully, or at least partially, satisfy the means, objects, and advantages over the prior art as set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

I claim:

1. A method for transmitting a data stream, over an extended distance of greater than 5 meters, between an extended range host controller and a peripheral device, wherein said peripheral device conforms to the requirements of the USB Specification, through a remote extender located within 5 meters of said peripheral device, which method comprises:

(A) for outgoing data streams: i) providing said extended range host controller with a maximum time value within which maximum time value said extended range host controller must complete transmission of a data packet to said peripheral device, through said remote extender, and begin receiving a response packet from said peripheral device, through said remote extender; and ii) adjusting said maximum time value in said extended range host controller to provide a maximum time value increased beyond the standard USB maximum time value which permits USB transmissions over said extended distance without incurring any time-out violations; and (B) for incoming data streams: a) forwarding a request for incoming data from said extended range host controller to said peripheral device by sending said request to said remote extender, and then having said remote extender forward said request to said peripheral device; b) having said peripheral device prepare and send said incoming data to said remote extender; c) having said remote extender optionally forward an acknowledgement of receipt to said peripheral device; d) having said remote extender forward said incoming data to said extended range host controller; and e) providing said extended range host controller with a maximum time value within which maximum time value said peripheral device must respond to said request and adjusting said maximum time value in said extended range host controller to provide a maximum time value increased beyond the standard USB maximum time value which permits USB transmissions over said extended distance without incurring any time-out violations.

2. A method for transmitting a data stream as claimed in claim 1, wherein said data stream is asynchronous data from an extended range host controller to a peripheral device, said method comprising:

a. transmitting, from said extended range host controller, a notification of asynchronous data to a remote extender over a signal distribution system;

b. receiving, at said remote extender, said notification of asynchronous data;

c. forwarding, from said remote extender, said received notification of asynchronous data to a peripheral device;

d. transmitting, from said extended range host controller, an asynchronous data packet to said remote extender over a signal distribution system;

e. starting, at said extended range host controller, a round-trip timer after the last data bit of said asynchronous data packet has been transmitted;

f. receiving, at said remote extender, said asynchronous data packet;

g. forwarding, from said remote extender, said received asynchronous data packet to said peripheral device;

h. receiving, at said remote extender, an acknowledgement token from said peripheral device;

i. forwarding, from said remote extender, said received acknowledgement token to said extended range host controller;

j. receiving, at said extended range host controller, said forwarded acknowledgement token; and k. stopping, at said extended range host controller, said round-trip timer when the first data bit of said forwarded acknowledgement token is received, wherein, the round-trip timer maximum value in said extended range host controller has been extended so that, when stopped, said round-trip timer value is less than said round-trip timer maximum value, so that a time-out violation is not generated.

3. A method for transmitting a data stream as claimed in claim 1, wherein said data stream is asynchronous data from a peripheral device to an extended range host controller, said method comprising:

a. transmitting, from said extended range host controller, a request for asynchronous data to a remote extender over a signal distribution system;

b. starting, at a host controller, a round-trip timer when the last data bit of said request for asynchronous data has been transmitted;
c. receiving, at said remote extender, said request for asynchronous data;
d. forwarding, from said remote extender, said received request for asynchronous data to said peripheral device;
e. receiving, at a remote extender, an asynchronous data packet from said peripheral device;
f. forwarding, from said remote extender, said received asynchronous data packet to said extended range host controller;
g. transmitting, from said remote extender, an acknowledgement token to said peripheral device;
h. receiving, at said extended range host controller, said forwarded asynchronous data packet;
i. stopping, at said extended range host controller, said round-trip timer when the first data bit of said forwarded acknowledgement token is received, wherein the round-trip timer maximum value in said extended range host controller has been extended so that, when stopped, said round-trip timer value is less than said round-trip timer maximum value, so that a time-out violation is not generated;
j. optionally transmitting, from said extended range host controller, a further acknowledgement token to said remote extender; and
k. optionally absorbing, at said remote extender, said further acknowledgement token.

4. A method as claimed in claim 2 wherein the extended round-trip delay caused by transmission over said extended distance is accommodated by said extended range host controller, said method comprising:
a. extending the maximum acceptable value of said round-trip timer; and
b. accepting as valid any packet that is received by said extended range host controller before said extended round-trip timer reaches said maximum time value.

5. A method as claimed in claim 4 wherein said maximum acceptable value of said round-trip timer is pre-set.

6. A method as claimed in claim 4 wherein said maximum acceptable value of said round-trip timer is dynamically set and varies depending on said extended distance.

7. A method as claimed in claim 6 wherein said maximum acceptable value of said round-trip timer is dynamically set on power-up of the system.

8. A method as claimed in claim 3 wherein the extended round-trip delay caused by transmission over said extended distance is accommodated by said extended range host controller, said method comprising:
a. extending the maximum acceptable value of said round-trip timer; and
b. accepting as valid any packet that is received by said extended range host controller before said extended round-trip timer reaches said maximum time value.

9. A method as claimed in claim 8 wherein said maximum acceptable value of said round-trip timer is pre-set.

10. A method as claimed in claim 8 wherein said maximum acceptable value of said round-trip timer is dynamically set and varies depending on said extended distance.

11. A method as claimed in claim 10 wherein said maximum acceptable value of said round-trip timer is dynamically set on power-up of the system.

12. A method as claimed in claim 1 wherein the frame structure of the USB protocol is preserved in the presence of an extended round-trip delay, said method additionally comprising:

(i) establishing, within said extended range host controller, a first end of frame (EOF1) marker, within a USB transmission frame, for completion of transmission of a data packet; and a second end of frame (EOF2) time, prior to the end of a USB transmission frame, wherein reception of a data packet receipt is to be completed;
ii) adjusting said first end of frame marker (EOF1) to provide for sufficient time to allow the transmission of said data packet and reception of said data packet receipt, over said extended distance, prior to said second end of frame (EOF2) marker; and
iii) postponing until the next frame any transaction that cannot be completed before the EOF2 point in the frame is reached.

13. A method as claimed in claim 3 wherein said acknowledgement tokens are generated at said remote extender by:
a. replacing, at a host controller, an IN token with a Reserved token;
b. transmitting, from said host controller, said Reserved token to a remote extender;
c. receiving, at a remote extender, said transmitted Reserved token;
d. converting, at a remote extender, said received Reserved token to an IN token;
e. transmitting, at a remote extender, said converted IN token to a peripheral device;
f. receiving, at a remote extender, an asynchronous data packet from a peripheral device; and
g. transmitting, at a remote extender, an acknowledgement token to said peripheral device.

14. A method as claimed in claim 3 wherein said acknowledgement tokens are generated at said remote extender by:
a. adding, at a host controller, a reply indicator to an original IN token to create an extended In token;
b. transmitting, at a host controller, said extended IN token to a remote extender;
c. receiving, at a remote extender, said transmitted extended IN token;
d. removing, at a remote extender, said reply indicator from said extended IN token to recreate said original IN token;
e. transmitting, at a remote extender, said original IN token to a peripheral device;
f. receiving, at a remote extender, an asynchronous data packet from a peripheral device; and
g. transmitting, at a remote extender, an acknowledgement token to said peripheral device.

15. A method as claimed in claim 3 wherein said acknowledgement tokens are generated during a split transaction at said remote extender by:
a. receiving, at a remote extender, a CSPLIT token from a host controller;
b. receiving, at a remote extender, an IN token from a host controller; and
c. inhibiting, at a remote extender, the generation of an acknowledgement token.

16. A method as claimed in claim 3 wherein said acknowledgement tokens are generated at said remote extender by:
a. sending, at a remote extender, an acknowledgement token to a peripheral device for every data packet that is received from a peripheral device;
b. monitoring, at a remote extender whether a corresponding acknowledgement token is received from a host controller;
c. storing, at a remote extender, the USB address and endpoint of said peripheral device;

d. storing at a remote extender, the acknowledgement behaviour of said host controller when communicating with said stored USB address and end-point; and e. altering, at a remote extender, the future generation of acknowledgement tokens for said stored USB and end-point according to said stored acknowledgement behaviour of said host controller.

17. An apparatus for transmitting data between a central processor and a peripheral device over an extended distance; said apparatus comprising:

a) a central processor unit for initiating a data-transfer session;

b) a host controller for performing a data-transfer session on command from said central processor unit, and for generating an original data-transfer command packet;

c) optionally, means for converting said original data-transfer command packet into a convened command packet having a format suitable for transmission over extended distances;

d) a signal distribution system;

e) means for transmitting said data-transfer command packet or said converted command packet, as a coded command packet, over said signal distribution system;

f) a remote extender unit for receiving said coded command packet, and optionally converting said coded command packet to said original data-transfer command packet;

g) means in said remote extender unit for delivering said original data-transfer command packet to a peripheral device;

h) means in said remote extender unit for receiving a data-transfer response packet from said peripheral device, and for optionally converting said data-transfer response packet to a converted response packet having a format suitable for transmission over extended distances;

i) means in said remote extender unit for transmitting said data-transfer response packet or said converted response packet, as a coded response packet, over said signal distribution system to said host controller;

j) optionally, means in said remote extender unit for sending a local data-transfer handshake packet to said peripheral device;

k) means for receiving, at said host controller, said coded response packet; and optionally converting said coded response packet to said data-transfer response packet;

l) means in said host controller for optionally generating a remote data-transfer handshake packet, and optionally converting said remote data-transfer handshake packet into a converted handshake packet having a format suitable for transmission over extended distances;

m) means in said host controller for transmitting said data-transfer handshake packet or said convened handshake packet, as a coded handshake packet, over said signal distribution system;

n) means in said remote extender unit for receiving said coded handshake packet, and optionally convening said coded handshake packet to said remote data-transfer handshake packet;

and wherein said host controller comprises: (i) means for establishing a maximum time value between the time where said host controller completes sending said data transfer command packet and begins receiving said coded response packet; ii) means for establishing a maximum time value increased beyond the standard USB maximum time value which permits extended range USB transmissions without incurring any time-out violations; and (iii) means for establishing a first end of frame marker (EOF1) for completion of transmission of said data transfer command packet, which first end of frame marker allows for completion of the receipt of said coded response packet within a selected second end of frame (EOF2) time, and optionally, said remote expander has means for providing an acknowledgement packet to said peripheral device, when required.

* * * * *